(12) United States Patent
Kaag

(10) Patent No.: US 10,094,525 B2
(45) Date of Patent: Oct. 9, 2018

(54) BATTERY POWERED LIGHTING SYSTEM

(71) Applicant: PHILIPS LIGHTING HOLDING B.V., Eindhoven (NL)

(72) Inventor: Bjorn Christiaan Wouter Kaag, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 12 days.

(21) Appl. No.: 15/032,947

(22) PCT Filed: Oct. 24, 2014

(86) PCT No.: PCT/EP2014/072870
§ 371 (c)(1),
(2) Date: Apr. 28, 2016

(87) PCT Pub. No.: WO2015/067485
PCT Pub. Date: May 14, 2015

(65) Prior Publication Data
US 2016/0270188 A1 Sep. 15, 2016

(30) Foreign Application Priority Data

Nov. 8, 2013 (EP) .................................... 13192064
Nov. 27, 2013 (EP) .................................... 13194570

(51) Int. Cl.
*H02J 1/10* (2006.01)
*F21S 9/03* (2006.01)
(Continued)

(52) U.S. Cl.
CPC ........... *F21S 9/035* (2013.01); *H01M 10/443* (2013.01); *H01M 10/46* (2013.01);
(Continued)

(58) Field of Classification Search
None
See application file for complete search history.

(56) References Cited

U.S. PATENT DOCUMENTS 8,518,574 B1 8/2013 Kwak
2010/0264737 A1 10/2010 Chandler et al.
(Continued)

FOREIGN PATENT DOCUMENTS

KR 1003072 B1 12/2010
WO 2010057138 A2 5/2010
(Continued)

Primary Examiner — Cassandra Cox

(57) ABSTRACT

There is provided a battery powered lighting system having illuminating units and a battery module with rechargeable batteries for providing electrical power to the illuminating units. A temperature sensor is arranged to measure a temperature of the battery pack. A charger and discharger are arranged to (dis)charge the battery module, where discharging means powering the illumination units. A control system is arranged to adjust a lighting profile using measurements received from the temperature sensor. The adjusted lighting profile will assures that the temperature of said battery module stays within a predefined temperature range, and in particular above a predefined temperature. This will extend the life time of the batteries.

13 Claims, 6 Drawing Sheets

(51) Int. Cl.

| | | |
|---|---|---|
| *H05B 33/08* | (2006.01) | |
| *H01M 10/44* | (2006.01) | |
| *H01M 10/48* | (2006.01) | |
| *H01M 10/615* | (2014.01) | |
| *H01M 10/643* | (2014.01) | |
| *H01M 10/623* | (2014.01) | |
| *H02J 7/00* | (2006.01) | |
| *H02J 7/35* | (2006.01) | |
| *H05B 37/02* | (2006.01) | |
| *H01M 10/627* | (2014.01) | |
| *H01M 10/46* | (2006.01) | |
| *H02J 7/02* | (2016.01) | |
| *H02J 7/04* | (2006.01) | |
| *F21Y 115/10* | (2016.01) | |

(52) U.S. Cl.
CPC ....... *H01M 10/486* (2013.01); *H01M 10/615* (2015.04); *H01M 10/623* (2015.04); *H01M 10/627* (2015.04); *H01M 10/643* (2015.04); *H02J 7/007* (2013.01); *H02J 7/0021* (2013.01); *H02J 7/0052* (2013.01); *H02J 7/0063* (2013.01); *H02J 7/025* (2013.01); *H02J 7/047* (2013.01); *H02J 7/35* (2013.01); *H05B 33/0854* (2013.01); *H05B 37/0227* (2013.01); *F21Y 2115/10* (2016.08); *H01M 2220/10* (2013.01)

(56) References Cited

U.S. PATENT DOCUMENTS

| | | |
|---|---|---|
| 2010/0271802 A1 | 10/2010 | Recker et al. |
| 2011/0133655 A1 | 6/2011 | Recker et al. |
| 2012/0080944 A1* | 4/2012 | Recker ............ H02J 9/02 307/25 |
| 2013/0154571 A1 | 6/2013 | Hou et al. |

FOREIGN PATENT DOCUMENTS

| | | |
|---|---|---|
| WO | 2011122476 A1 | 10/2011 |
| WO | 2013076546 A1 | 5/2013 |
| WO | 2013110406 A1 | 8/2013 |

* cited by examiner

BATTERY POWERED LIGHTING SYSTEM

CROSS-REFERENCE TO PRIOR APPLICATIONS

This application is the U.S. National Phase application under 35 U.S.C. § 371 of International Application No. PCT/EP2014/072870, filed on Oct. 24, 2014, which claims the benefit of European Patent Application No. 13192064.7, filed on Nov. 8, 2013 and European Patent Application No. 13194570.1, filed on Nov. 27, 2013. These applications are hereby incorporated by reference herein.

FIELD OF THE INVENTION

The invention relates to the field of lighting system, and more specifically to battery powered lighting systems, such as solar powered off-grid street lighting. It also relates to a method of operating a battery powered lighting system.

BACKGROUND OF THE INVENTION

Today, more and more grid connected street lighting is replaced by solar powered off-grid street lighting, also referred to as solar powered OSL. Present solar powered street poles use batteries to store the energy for use in the night. The most frequently used battery type for this purposes is a lead battery (i.e. Pb battery), because of its relatively low cost. Present Pb batteries have a relative short life of 2 to 3 years. This is mainly caused by the solar application: when a Pb battery would be recharged immediately after discharge, and with the correct charging profile, it may enjoy life of up to 5 years. But the solar application does not always produce enough current for a complete recharge, especially in the winter where the Pb battery is run in a partially charged condition (i.e. partial State Of Charge). The result is that Pb is typically short lived at 2 to 3 years which is not deemed sufficient. Battery lifetime is considered a main differentiator.

Alternatively, lithium batteries may be used which have much longer life, with claims of 20 years under optimal conditions. But also for Li-Ion, the outdoor solar charging conditions limit life, this time caused by the temperatures under operation. The batteries' performance under cold conditions is a fraction of the performance under warmer test conditions of typically 25° C. This is caused by the Arrhenius factor, which describes the limited chemical kinetics at lower temperatures. In addition, when using Lead acid batteries, at temperatures slightly below zero the electrolyte will freeze up. The mitigation is to over dimension the battery, so it can still release enough power.

Some battery technologies will degrade when charged at subzero temperatures. An example is the above mentioned Li-Ion technology, which will suffer from Lithium plating under such conditions when it is charged with a high current, resulting in a very strong reduction in life. Mitigation against Lithium plating may be an internal heating system, which consumes energy that had to be put into the battery. This causes increased cost for the larger PV requirement. Alternatively the battery may be buried under ground below the frost layer, at e.g. 1 m. But again, this will add cost for ground works. Another mitigation is to limit the charge current when the battery is cold, but since the charge duration is limited to the daytime and it is almost impossible to plan charging interruptions due to clouds and shadows, the battery may not be fully charged.

The document WO2011122476 (A1) describes a device which is less likely to turn off as a result of restricting the power consumed depending on the amount of power generated or stored during winter time. Disclosed is an illumination device provided with a solar cell device, a storage battery which is charged by means of the power supplied from the solar cell device, an illuminating unit which emits light by means of the power supplied from the storage battery, a sensor which measures the outer temperature, and a control device which controls the charge and discharge of the storage battery. LED lights are used in the illumination unit for which the brightness increases as the temperature drops. So when the temperature drops, the illuminating unit will need less power from the storage battery in order to maintain the same illumination level. In this way energy can be saved at low temperatures. Saving energy is to be praised but there is a risk that the temperature of the batteries will reach such low levels that the life time of the batteries is disadvantageously affected.

SUMMARY OF THE INVENTION

It is an object of the invention to provide a battery powered lighting system in which the chance of a too low temperature of the batteries is decreased as compared to known systems.

For this purpose, according to a first aspect of the invention, a battery powered lighting system is provided which comprises one or more illuminating units and a at least one battery module comprising one or more rechargeable batteries, for providing electrical power to said one or more illuminating units. A first temperature sensor is arranged to measure a temperature of said battery module. A charger is comprised for charging said battery module and a discharger for discharging said battery module by powering said one or more illumination units. A control system is arranged to receive measurement data from said first temperature sensor, and to receive or determine a lighting profile. The lighting profile comprises information on illumination levels during a certain time period. The control system is also arranged to adjust said lighting profile using said measurements received from said first temperature sensor, to render an adjusted lighting profile which assures that said temperature of said battery module stays above a predefined temperature. The charger and discharger will be controlled using said adjusted lighting profile.

The battery powered lighting system may be a lighting pole for lighting a street during periods of darkness. The received or determined lighting profile may contain several different illumination levels. For example, a first level of no illumination, a second level of maximum illumination, and a third level in between said first and second level. Such a simple profile is very practical for lighting roads and cities during the night, where at some point in time during the night the light can be dimmed to a lower illumination level because there will be less traffic. For example, between 2 AM and 5 AM, certain highways will not have a lot of traffic, and light could be dimmed to save energy. However during cold night, temperatures may drop to a point where the batteries may be seriously affected. Overcold batteries will have limited performance during discharge but will generally not suffer increased degradation. In case the lighting system comprises a solar power module arranged to deliver electricity to said charger of said battery module, the battery module will be recharged by the solar power module at the beginning of the day or on a later time of the day. If the temperature of the batteries is below a critical level when charging the batteries, the life time of the batteries will decrease. To avoid this unwanted situation, the control system is arranged to adapt the lighting profile such that the dimming of the light is less than first prescribed by the lighting profile. Less dimming of the lights means using more energy for the lights and discharging the batteries to a larger extend. This higher discharging will warm up the battery module due to electronic and electrochemical losses, which is wanted in order to avoid the critical low temperature.

In an embodiment the battery powered lighting system further comprises a second temperature sensor arranged to measure an ambient temperature. The control system receives measurement data from said second temperature sensor, and adjusts said lighting profile using said measurement data received from said first and said second temperature sensor. In case of a solar powered light pole, the second sensor may be arranged on or in an outer surface of the pole or any other suitable location where an ambient temperature can be measured. By measuring the battery temperature and the outside air temperature, the control system can estimate a future battery temperature given a certain charging or discharging profile, more effectively than in case only the battery temperature sensor is present. For example, when a heating resistance (i.e. the ability of material to conduct heat) is known between the battery and the outer surface of the pole, and also the heating capacity of the battery module, future temperatures can be calculated in a relatively easy manner.

In a further embodiment, the control system comprises a heat predictor arranged to determine a preferred charge-discharge profile for the battery module. Furthermore a charge-discharge control engine is arranged to receive said charge-discharge profile from said heat predictor and to control said charger and discharger using said charge-discharge profile. Heat prediction makes proactive timely control of battery temperature possible. Proactive control is advantageous for slow processes, such as the warming and cooling of the batteries, where a reactive response may not be sufficient. By adapting the lighting profile in advance (e.g. reducing light dimming and increasing light levels), a too low temperature can be avoided without the need for sudden additional heating.

The preferred charge-discharge profile can be determined using a power supply map comprising an expected power supply profile for a period of time, and a power demand map comprising an expected power demand for said period of time. The expected power supply profile could be made using for example climate data and weather forecast data, so as to be able to calculate the amount of power supply during a specific day or number of days. The power demand map could for example be made using a preferred lighting profile.

In an embodiment the battery powered lighting system further comprises a heating element for heating said battery module. The heat predictor may then be arranged to also determine a preferred heating profile for the battery module. The charge-discharge control engine may be arranged to receive said heating profile from said heat predictor and to control said heating element using said heating profile. The additional heating element and the additional heating profile for this heating element make the system more reliable/flexible. In case where discharging the batteries is not enough for avoiding too low temperatures, the additional heater can help. This will decrease the risk of too low temperatures of the batteries.

In an embodiment the battery powered lighting system comprises a battery pack comprising a number of battery modules, arranged on top of each other. By stacking the battery modules, less space is required to store the batteries in the pole.

In a further embodiment the battery module comprises a number of batteries arranged in parallel within a substantially cylindrical housing. Such modules are easy to install in light poles and could be made stackable so as to be able to correctly dimension a battery pack. This may depend on the illumination units used, the requested illumination level, the climate, the latitude, etc.

The housing may comprise an insulation layer arranged to insulate the content of the module, i.e. the battery cells. In this way the batteries will be isolated from the surroundings, which will help to delay and avoid low temperatures, which is advantageous for example when temperatures drop below zero during night. The insulation layer may be manufactured using for example aerogel or polystyrene materials. The modules may comprise a central opening arranged to receive a rod shaped heating element. This will allow the modules to be heated from the inside, which is more efficient than from outside in.

According to a second aspect of the invention, there is provided a method of operating a battery powered lighting system comprising at least one battery module where the method comprises the:

charging said battery module using a charger;

powering one or more illumination units of said system using a discharger;

measuring a temperature of said battery module using a first temperature sensor;

receiving or determining a lighting profile, said lighting profile comprising information on illumination levels during a certain time period;

adjusting said lighting profile using measurements received from said first temperature sensor, to render an adjusted lighting profile which assures that said temperature of said battery module stays above a predefined temperature;

controlling said charger and discharger using said adjusted lighting profile.

Further preferred embodiments of the device and method according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
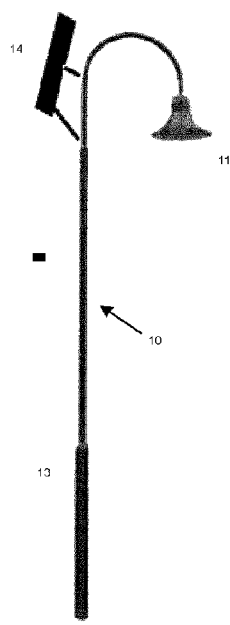
FIG. 1 shows an example of a battery powered lighting system being a solar powered light pole.

FIG. 1 shows an example of a battery powered lighting system being a solar powered light pole 10. The light pole comprises an illumination unit 11 supported by a pole 12 having a widening 13 near the ground (not shown). The system also comprises a Photovoltaic (PV) panel 14 arranged to generate electrical power using sun light. Inside the widening 13 of the pole 12 a battery pack (not shown in FIG. 1) may be arranged to store electrical energy received from the PV panel 14. If the battery pack is charged, it can provide electrical power to the illumination unit 11. The illumination unit 11 may comprise LEDs or any other lighting elements using electricity. It should be clear that the battery pack is stored inside the pole 12 but that it can be stored anywhere in the pole 12, preferably above ground level to avoid unwanted temperature gradients.

Figure 2A:
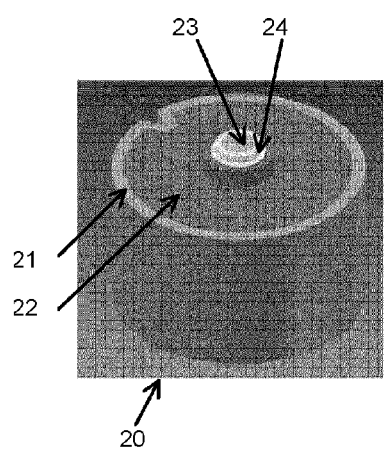
FIGS. 2A, 2B and 2C schematically show an embodiment of a battery module.
Figure 2B:
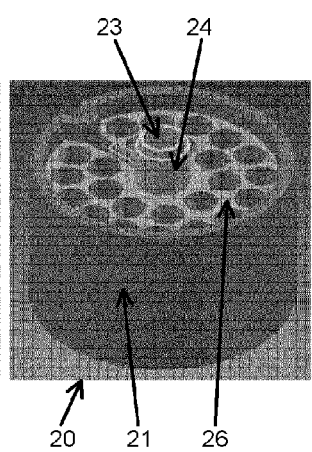
Figure 2C:
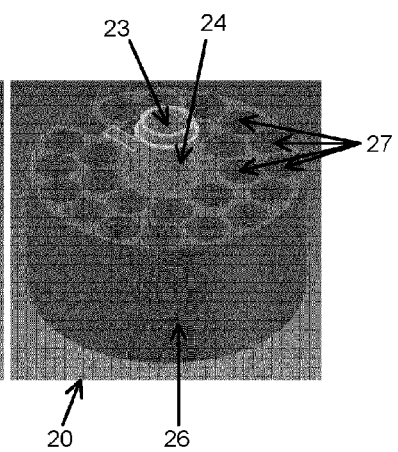

The battery pack inside the pole 12 may comprise one or more battery modules. FIGS. 2A, 2B and 2C schematically show an embodiment of such a battery module. A battery module 20 comprises a substantially cylindrical housing comprising a wall 21 and a bottom (not shown) and a cover 22. At a central part of the module 20 an opening is arranged surrounded by a tube shape pipe 24 which extends upwards. FIG. 2B shows the battery module 20 of FIG. 2A but with the cover 22 removed, and FIG. 2C shows the battery module 20 of FIG. 2A but with the cover 22 and the wall 21 removed. As can be seen from FIG. 2C, the module 20 comprises a cylinder shaped inner body 26 having a plurality of holes 27 for receiving the battery cells (i.e. the batteries). In this embodiment, the battery cells are arranged in parallel and co-axial with the central pipe 23. The module 20 shown is especially suitable for powering lighting systems having cylindrical shaped poles. It should be understood that other shapes for the modules are possible, and this may depend on the application.

Figure 3:
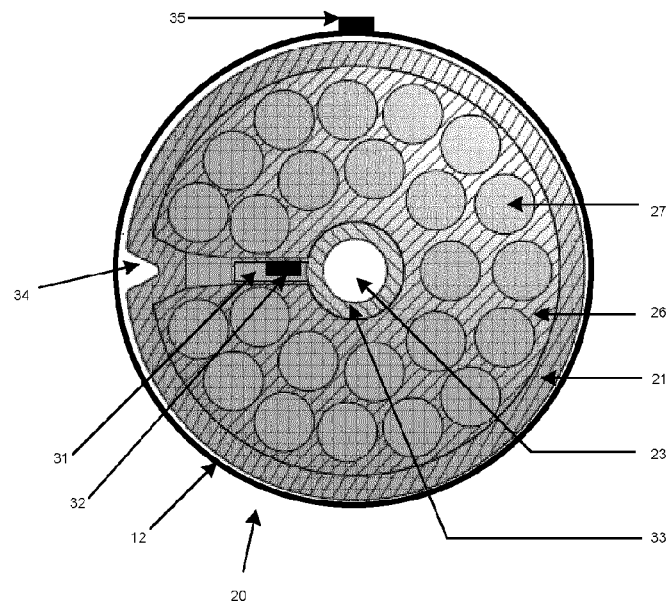
FIG. 3 schematically shows a top view of an embodiment of the battery module placed inside a pole with the cover removed.

FIG. 3 schematically shows a top view of an embodiment of the battery modules 20 placed inside the pole 12 and with the cover removed. As can be seen the inner body 26 comprises a plurality of holes 27 for placing the batteries. At an inner part of the module an electronic module 31 is arranged which may comprise a first temperature sensor 32. The first sensor 32 is arranged to measure the temperature of the batteries. The inner body 26 is preferably made of a thermal conductive material, such as for example stanyl, so that the temperature of the batteries across the module will not deviate too much, and the measured temperature measured by sensor 32 will reflect the temperature of all the batteries. The wall 21 of the module is preferably made of an insulating material, such as for example aerogel or polysterene so that the batteries are isolated from their surroundings, and less heat will be lost. Around the hole 23 an additional isolating tube 33 may be present to isolate the batteries towards the central axis. The battery module 20 also comprises a groove 34 for cable guidance inside the pole 12. In the example of FIG. 3, a second temperature sensor 35 is arranged at the outside of the pole 12. The second sensor will measure the outside temperature, also referred to as ambient temperature.

Figure 4:
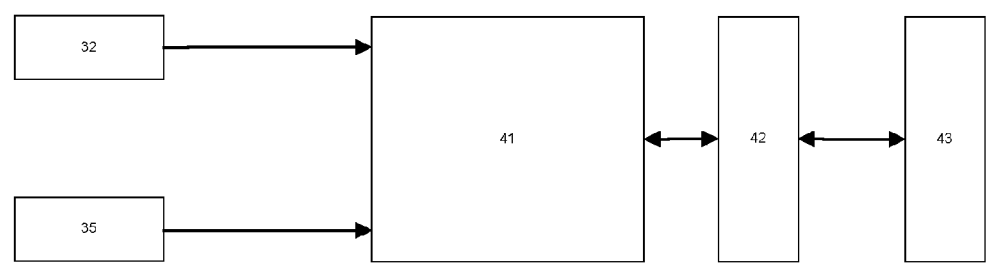
FIG. 4 schematically shows a control system and the first and second sensor according to an embodiment.

FIG. 4 schematically shows a control system 41 and the first and second sensor 32, 35 according to an embodiment. The control system 41 is arranged to receive measurement data from the sensors 32, 35. It is noted that the second sensor 35 may be optional and that the control system 41 may only use the data from the first sensor 32. In an embodiment, the control system 41 is arranged to communicate via an I/O unit 42 to other systems, such as a remote server 43 in a computer network. In this way the control system 32 is able to receive augmented data. This augmented data may be e.g. up-to-date weather information to be used in the adjustment of the lighting profile. It may also send its own measured data to the remote server to gather useful information for other systems or users. The remote server or other systems may process an updated lighting profile with predictive advise offline and send this to the pole.

Figure 5:
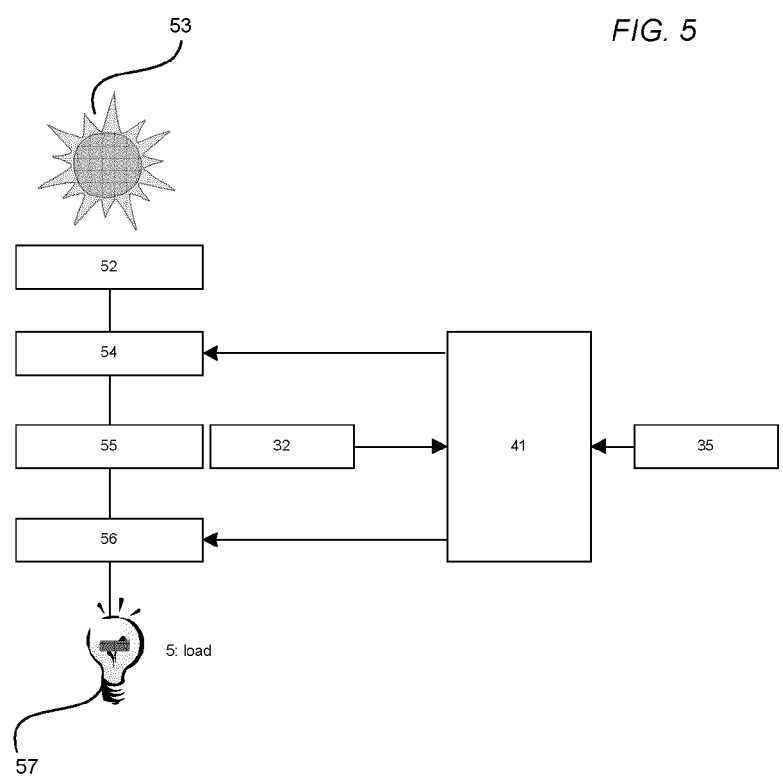
FIG. 5 shows an example of a functional diagram of an OSL system comprising the control system.

FIG. 5 shows an example of a functional diagram of an OSL system comprising the control system 41. The OSL system comprises a PV module 52 arranged to generate electrical power from light from the sun 53. A charger 54 is arranged to charge a battery pack 55. In this case the charger is a solar charger known to the skilled person. A discharger 56 is arranged to discharge the battery pack 55 by powering one or more illumination units, see light bulb 57, which represent all kinds of possible lighting types, such as LED, Halogen etc. As mentioned above the control system 41 is arranged to receive measurement data from said first temperature sensor and possibly from the second sensor 35. The control system 41 is able to receive or determine a lighting profile. This lighting profile comprises information on illumination levels during a certain time period. The lighting profile is adjusted using said measurements received from at least the first temperature sensor 32 to render an adjusted lighting profile. The lighting profile is adjusted in a way that assures that said temperature of said battery pack stays within a predefined temperature range. Once the lighting profile has been adjusted, the control system 41 controls the charger 54 and the discharger 56 using said adjusted lighting profile.

Some components typical in battery powered OSL architecture are not shown in FIG. 5 for the sake of clarity. It shall be appreciated that other embodiments are possible and that the invention is not limited by FIG. 5. As is to be understood by a person skilled in the art the battery powered lighting system 10 could be charged from a different source than the sun as for instance the power grid, via generators such as diesels generator or fuel cells.

Figure 6:
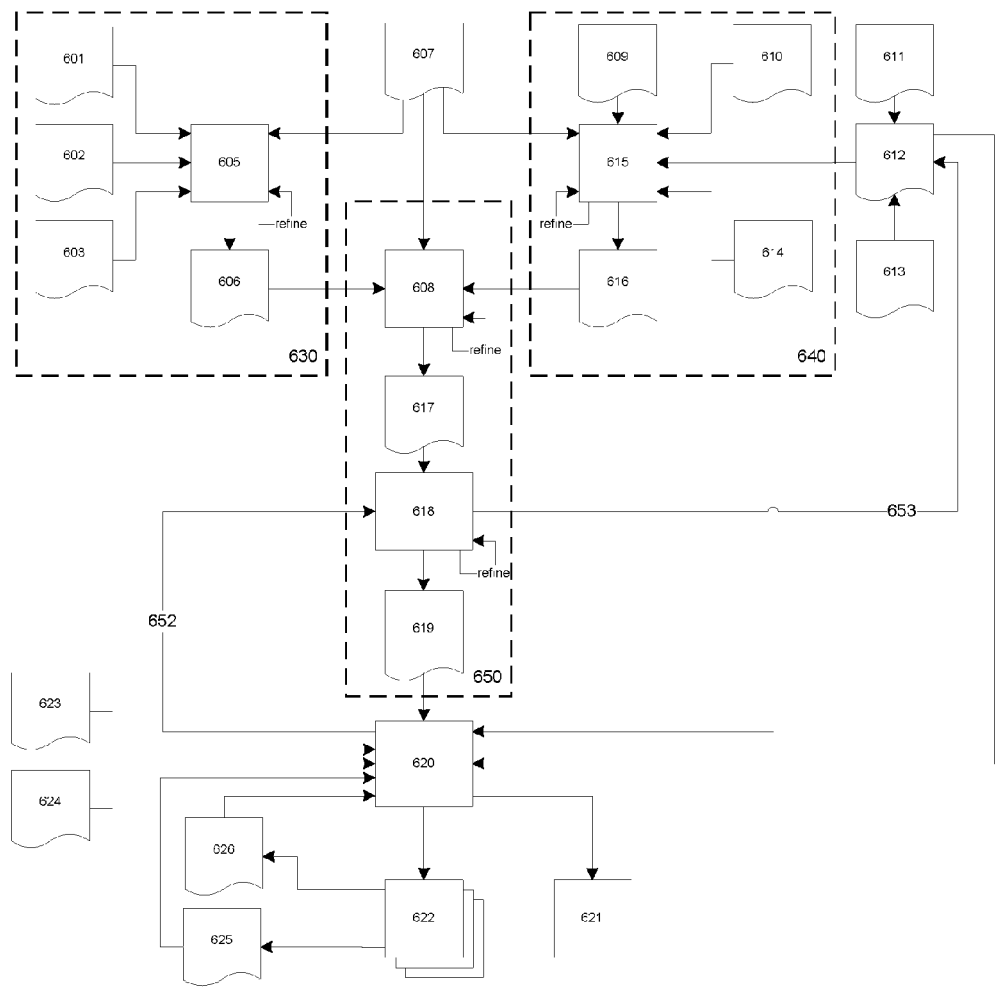
FIG. 6 shows a process scheme for the control system according to an embodiment.

FIG. 6 shows a process scheme for the control system 41 according to an embodiment. In FIG. 6 the square blocks represent a specific function such as a computation, and the block having a waved bottom edge represent data, such as a document or a profile or a map. In this example a climate profile 601 and backup restore duration data 602 together with recorded local PV performance data 603 is input for a computation of an expected power supply for one or several days. The computation 605 results in a power supply map 606, which is, together with augmented data 607 input for an energy balance computation 608. To determine how much power is needed, anti-freeze data 609, and possibly information on a limit of a backup capacity 610, together with a lighting profile 612 and possibly information on parasitic load(s) is input for a power demand computation 615. The lighting profile 612 comprises information on the daily sunset and sunrise, see 611, and recorded adaptive dimming data 613, which will be explained later on. Computation of the power demand results in a power demand map 616. This power demand map 616 is also input for the energy balance computation 608, which will produce an energy balance map 617. This energy balance map 617 is used in the computation of a heat prediction, see heat predictor 618. This results in an operational charge-discharge advise 619. This advice may also comprise a suggestion on how much additional heat is needed by when in order to proactively inject additional heat into the battery module(s).

The operational charge-discharge advise 619, also referred to as the heat prediction map 619, is used by a charge-discharge control engine 620 which will determine when and how much to charge or discharge the different battery modules, and control the heater if available.

Each battery module may be controlled by one battery controller 622 receiving the instructions from block 620. The optional heater may be controlled by a heater controller 621 as shown at the bottom of FIG. 6.

Also the actual local PV performance data 623 may be used by the charge-discharge control engine 620, together with the actual ambient temperature measures by the second temperature sensor 35. A battery module temperature 625 and data on the State of Charge and State of Health of the batteries, see block 626, are input for the charge-discharge control engine 620.

In FIG. 6 three main blocks are depicted using dashed lines. The first is referred to as the power supply management 630, the second as the power demand management 640 and the third as the energy balance and heat prediction management 650. FIG. 6 further shows an arrow 652 indicating that the charge-discharge control engine 620 output information to the heat predictor 618 as a feedback loop. The heat predictor 618 outputs information 653 to the lighting profile 612 to align with the present local dimming scheme and check if the required load can still as will be explained further on.

The control system 41 may receive a preferred dimming profile or determine one by itself. The control system 41 may override the preferred dimming profile to produce enough heat for example from resistance losses to keep the battery in a comfort zone, i.e. within a certain temperature range having an allowed maximum temperature and an allowed minimum temperature.

The energy demand and energy supply is compared by the energy balance management 650 and results in the heat prediction map 619. The heat prediction map 619 can be comprised of charge and discharge advice or heating advice or both. An algorithm may be used to progressively compute how much heat is required to keep the battery in the thermal comfort zone and prevent an overcooled battery at the start of charging (at sunrise) and an overheating battery (which may happen during the day). The amount of heat is a variable dependent on constantly changing ambient temperature and battery temperatures. The actual ambient temperature is subjected to geographical location, climate, day in the year and time of day/night. The battery temperature depends on the amount of energy charged into the battery which relates to the solar path subject to subjected to geographical location, climate, and day in the year. The battery temperature also depends on the amount of energy discharged from the battery which relates to the light load and dimming profile which is subject to day in the year, weather and additional losses and the potential usage of the optional heater.

The battery (dis)charging system has a delay in heating. So avoid the minimal temperature of the batteries from dropping below the comfort zone at the moment or shortly after the charging starts, the algorithm in an embodiment will progressively determine the point in time when more heat is required. This decision is to be aligned with the present local dimming scheme of the light load: if possible and required the dimming may be overridden and the light control is turned to a higher brightness so as to produce more heat from resistance losses in the battery.

The allowed minimum temperature may be reached shortly after sunrise, since the current from PV is very small directly at sunrise and will rise quickly after some delay. This delay is a variable dependent on geographical location and day in the year.

Input for the discharge control engine 620 may comprise the information how many battery modules need to be committed. A battery pack can be configured from multiple battery modules and the bottom module will be warmer than the top battery module. In an embodiment, the discharge control engine 620 takes this difference into account and will begin charging with the module that will be warmest at sunrise to limit additional energy use required for the heating. This information may be generated from simulations results preloaded in the system, or recorded and optimized from previous charge and discharge cycles.

In implementations where the resistance losses from discharging are enough to generate the required heat, the control system may override the local dimming profile of the light so as to generate enough heat, whereas in other occasions an additional and optional heater inside the battery pack may be required to produce the missing heat.

In an embodiment, the heat predictor 618 computes an operational (dis)charge and heating advice for the (dis)charge control engine. This may be in e.g. total hours of (dis)charge and/or amount of (dis)charge for every module or another (dis)charge/heating strategy. When the required heat cannot be produced from resistance losses alone, the optional heater may be ordered to produce heat.

The decision if the requested heating is (im)possible may be augmented by additional considerations, such as for example a configurable duration in days/hours of additional runtime (above the nightly load), or a risk appetite, which may be fixed or dynamically updated, for example in relation to recorded weather events. The risk appetite may for example be (how) to accept that the battery will be depleted and cannot power the load completely until the end of the lighting profile.

Figure 7:
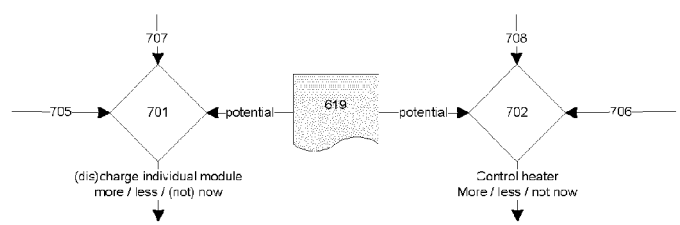
FIG. 7 schematically shows an example of a decision process of controlling the battery charging and discharging and the heating of the heater when available.

FIG. 7 schematically shows an example of a decision process of controlling the battery charging and discharging and the heating of the heater when available. The operational advice 619 determined by the heat predictor 618 is used for deciding when to throttle the charging or discharging of the batteries, see block 701. The same is done for the throttling of the heating element, see block 702. Upon request 707, the discharge potential 619 maybe compared to a risk appetite 705. Similarly the request 708 may lead to comparison of discharge potential 619 with risk appetite 706. Under adverse weather conditions the advice may risk that the battery is depleted by producing extra heat and the system will control if this is allowed to take that risk or not. Depleting the energy could happen when there is for example a low energy supply (e.g. solar harvest) versus high energy demand (e.g. lighting and indirect heat demand).

Figure 8:
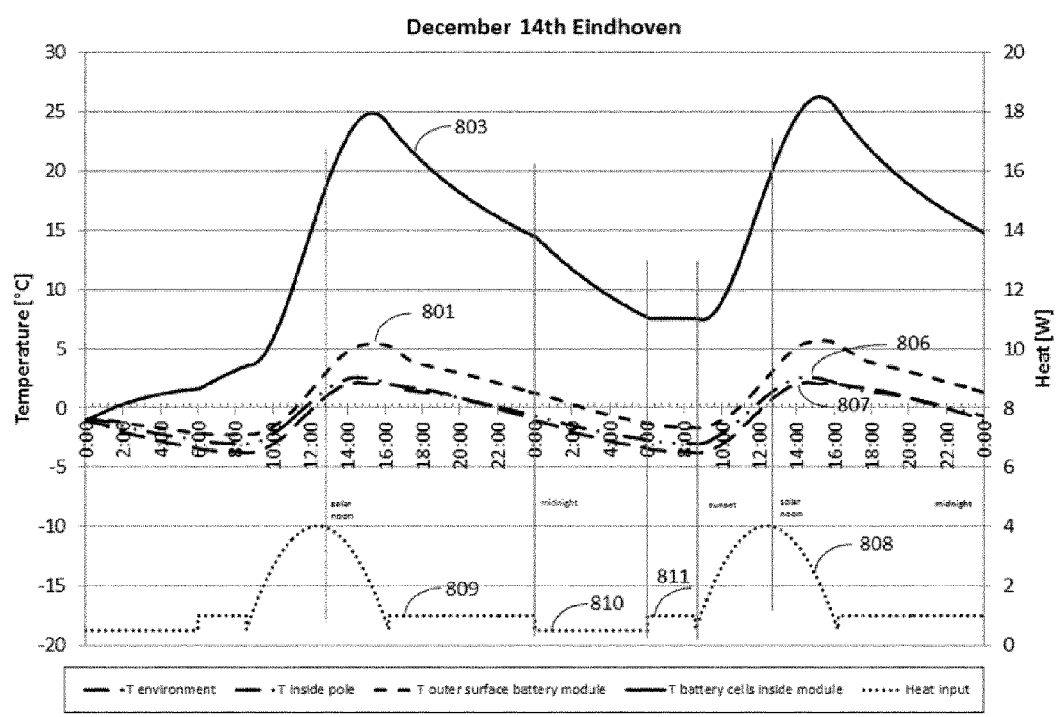
FIG. 8 shows a graph of the temperature simulations of the battery pack during a winter night in Eindhoven the Netherlands in December.

As discussed above the control system 41 may be arranged to adapt the dimming profile of the light to adaptively control the internal temperature of battery ring. As an example FIG. 8 shows that the minimal temperature of the inside of the pole drops below zero, see line 807, during a winter night in Eindhoven the Netherlands in December. The outside ambient temperature is even lower, see line 801. After dimming from 0:00 h to 06:00 h, the control system 41 stops the dimming to increase the temperature of the battery pack. The control system 41 may proactively determine when and by how much dimming is possible as long as temperature remains in the comfort zone. The control system 41 may use a thermal model or other means to predict how much heat must be injected proactively into the battery pack to achieve performance inside the comfort zone's minimum and maximum temperature and takes into account climate and other data, from sensors or other sources.

For the thermal simulation on FIG. 8 the heat in the battery pack is generated by the electronics resistance losses of the battery management electronics 31, the electrochemical losses of the battery cells themselves in 27 and (optionally) the center core in 23 which may implement a heater element. With the heat injection of the electronics, batteries and heater, the temperature can be controlled to remain in the battery cell's comfort zone. If this heat source is excluded and only the heat generated in the batteries and electronics is taken into account the temperature drops below 0° C. in the pack when operated in the climate of Eindhoven, Netherlands: in that case, upon start of the solar charging, the low temperature will likely cause lithium plating, strongly degrading life of the battery cell(s). As is shown in 801 the temperature of the outer surface of the battery module drops below zero degrees Celsius during the end of the night and is only slightly higher than 806 the temperature inside the pole and 807 the ambient temperature outside of the pole. Due to good insulation of the batteries the leakage of heat in the battery module to the environment is delayed. The solar charging profile 808 and the lighting profile with for example levels 809 and 810 leads to heat injection into the battery. As can be observed in 803, the temperature of the battery module cools down from some hours after solar noon. When the light is switched on at a particular light level x the resultant heat into the battery 809 will cool down of the battery progresses by rate a. When the light is dimmed to a particular light level y the resultant heat 810 that is injected into the battery is lower. The control system will compute if the battery will cool down to below the comfort zone and proactively alter the light level at a certain point in time to result in a higher amount of heat 811 injected into the system.

Figure 9:
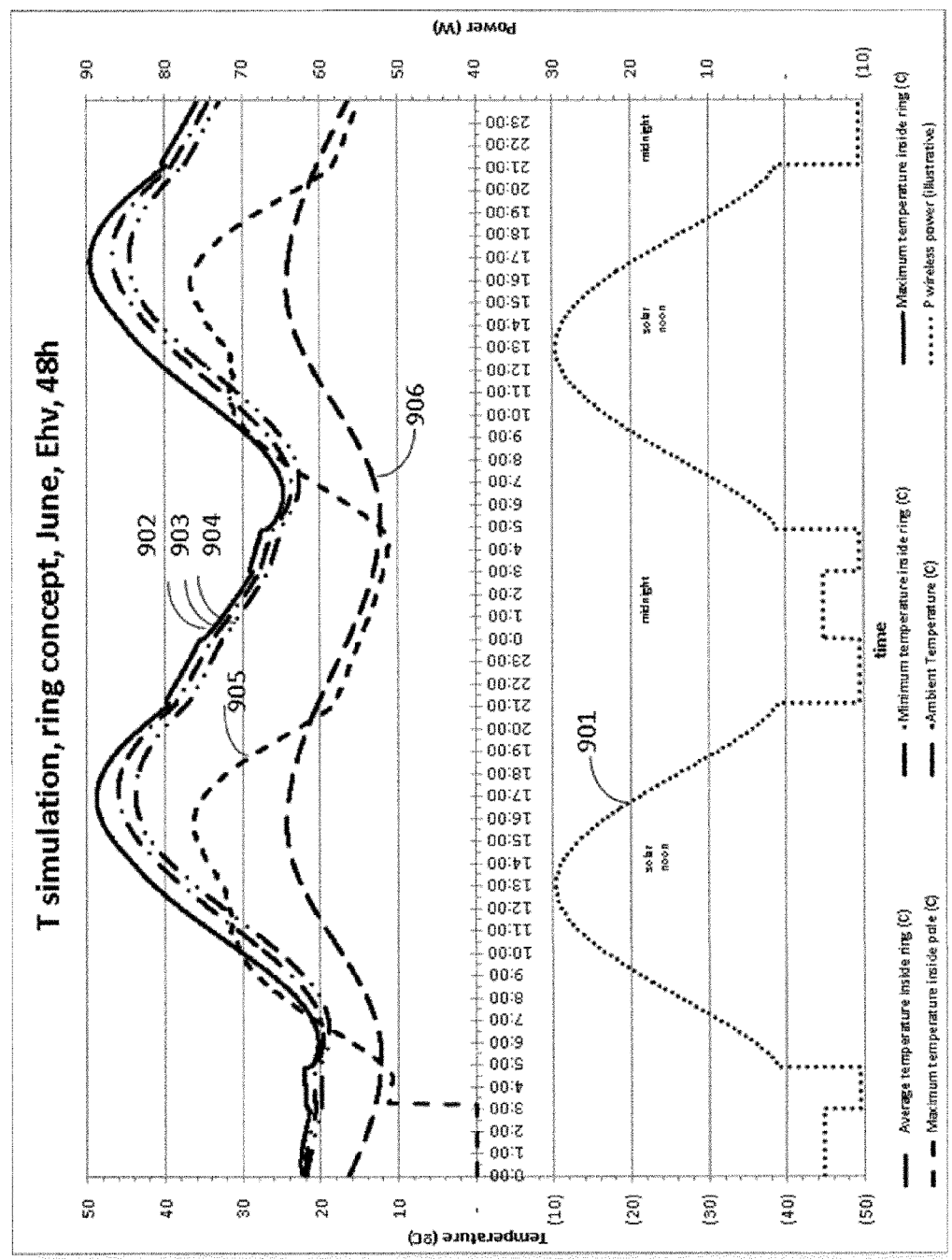
FIG. 9 shows another example of a graph of the temperatures of the battery pack and the supplied energy as a function of time.

Another example is shown in FIG. 9 which is a graph of the temperatures of the battery module and the supplied energy as a function of time. In FIG. 9 line 901 indicates the supplied energy in Watts, line 902 indicates the maximum module temperature, line 903 indicates the average module temperature and line 904 indicates the minimum module temperature. FIG. 9 is typical for the month June in the Netherlands and demonstrates that the minimum and maximum temperature can be kept in the comfort zone of the battery pack, where battery cycling experiments have demonstrated that the cells have a long life. The advantage of the present invention is shown in this timeline. As can be seen in FIG. 8 the period from 0:00 h to 06:00 h, the dimming levels are very high and the battery cools down fast. But by altering the dimming level from 6 h to 9 h, to increase the heat injection, the control system 41 prevents that the temperatures drop too much and the temperature can be kept in the comfort zone (i.e. between 10° C.-50° C.). As can be seen in FIG. 9 the temperatures in the summer will not get too high and stay within the comfort zone. This ensures good life of the battery cells and the battery pack.

Although the invention has been mainly explained by embodiments using the internet, the invention is also suitable for any other type of OSL systems or any other lighting system charged by batteries.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:

1. Battery powered lighting system comprising:
   one or more illuminating units;
   at least one battery module comprising one or more rechargeable batteries, for providing electrical power to said one or more illuminating units;
   a first temperature sensor arranged to measure a temperature of said battery module;
   a second temperature sensor arranged to measure an ambient temperature;
   a charger for charging said battery module;
   a discharger for discharging said battery module by powering said one or more illumination units;
   a control system arranged to:
      receive measurement data from said first temperature sensor and said second temperature sensor;
      receive or determine a lighting profile, said lighting profile comprising information on illumination levels during a certain time period;
      adjust said lighting profile using said measurements received from said first and second temperature sensors, to render an adjusted lighting profile which assures that said temperature of said battery module stays above a predefined temperature;
      control said charger and discharger using said adjusted lighting profile.

2. Battery powered lighting system according to claim 1, wherein said lighting profile comprises a first level of no illumination, a second level of maximum illumination, and a third level in between said first and second level.

3. Battery powered lighting system according to claim 1, wherein said battery powered lighting system comprises a solar power module arranged to deliver electricity to said charger of said battery module.

4. Battery powered lighting system according to claim 1, wherein said battery powered lighting system comprises a battery pack comprising a number of battery modules, arranged on top of each other.

5. Battery powered lighting system according to claim 1, wherein said battery module comprises a number of batteries arranged in parallel within a substantially cylindrical housing.

6. Battery powered lighting system according to claim 5, wherein said housing comprises an insulation layer.

7. Battery powered lighting system according to claim 5, wherein each of said modules comprises a central opening arranged to receive a rod shaped heating element.

8. Battery powered lighting system comprising:
one or more illuminating units;
at least one battery module comprising one or more rechargeable batteries, for providing electrical power to said one or more illuminating units;
a first temperature sensor arranged to measure a temperature of said battery module;
a charger for charging said battery module;
a discharger for discharging said battery module by powering said one or more illumination units;
a control system arranged to:
  receive measurement data from said first temperature sensor;
  receive or determine a lighting profile, said lighting profile comprising information on illumination levels during a certain time period;
  adjust said lighting profile using said measurements received from said first temperature sensor, to render an adjusted lighting profile which assures that said temperature of said battery module stays above a predefined temperature;
  control said charger and discharger using said adjusted lighting profile; wherein said control system comprises:
a heat predictor arranged to determine a preferred charge-discharge profile for the battery module;
a charge-discharge control engine arranged to receive said charge-discharge profile from said heat predictor and to control said charger and discharger using said charge-discharge profile.

9. Battery powered lighting system according to claim 8, wherein said heat predictor is arranged to determine said preferred charge-discharge profile using:
a power supply map comprising an expected power supply profile for a period of time;
a power demand map comprising an expected power demand for said period of time.

10. Battery powered lighting system according to claim 8, further comprising a heating element for heating said battery module, wherein said heat predictor is arranged to determine a preferred heating profile for the battery pack, and wherein said charge-discharge control engine is arranged to receive said heating profile from said heat predictor and to control said heating element using said heating profile.

11. Method of operating a battery powered lighting system comprising at least one battery module, said method comprising:
charging said battery module using a charger;
powering one or more illumination units of said system using a discharger;
measuring a temperature of said battery module using a first temperature sensor;
measuring an ambient temperature using a second temperature sensor
receiving or determining a lighting profile, said lighting profile comprising information on illumination levels during a certain time period;
adjusting said lighting profile using measurements received from said first and second temperature sensors, to render an adjusted lighting profile which assures that said temperature of said battery module stays above a predefined temperature;
controlling said charger and discharger using said adjusted lighting profile.

12. A lighting system comprising:
one or more illuminating units;
at least one rechargeable battery module having a charger/discharger for providing electrical power to said one or more illuminating units;
a one or more temperature sensors arranged to measure at least one of a temperature of said battery module or an ambient temperature;
a control system arranged to receive measurement data from said one or more temperature sensors, receive or determine a lighting profile, said lighting profile including illumination level/power demand for at least two respective time periods;
  adjust said lighting profile based said measurements received from said one or more temperature sensors and a respective time period, to render an adjusted lighting profile which assures that said temperature of said battery module stays above a predefined temperature during said respective time period;
  control said charger/discharger using said adjusted lighting profile.

13. Method of operating a battery powered lighting system comprising at least one battery module, said method comprising:
charging said battery module using a charger;
powering one or more illumination units of said system using a discharger;
measuring at least one of a temperature of said battery module or an ambient temperature using one or more temperature sensors;
receiving or determining a lighting profile, said lighting profile including illumination level/power demand for at least two respective time periods;
adjusting said lighting profile using measurements received from said one or more temperature sensors and a respective time period, to render an adjusted lighting profile which assures that said temperature of said battery module stays above a predefined temperature;
controlling said charger and discharger using said adjusted lighting profile.

* * * * *